Aug. 4, 1936.   S. T. WILLIAMS   2,049,532
PRESSURE GAUGE
Original Filed Aug. 30, 1933
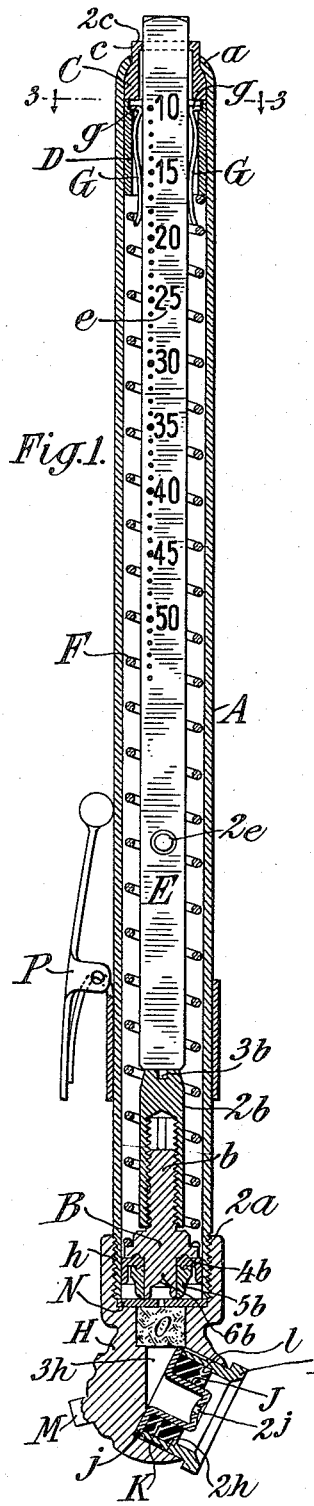
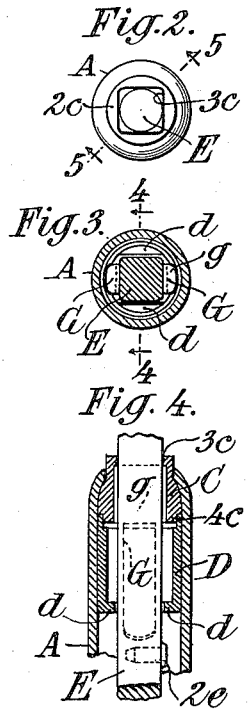
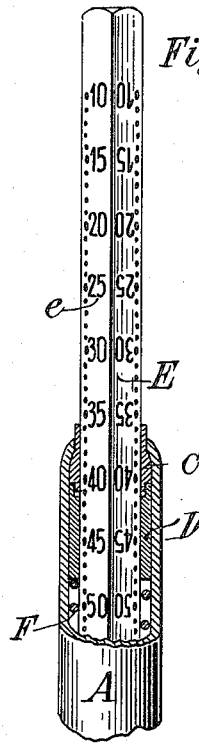
INVENTOR
Selden T. Williams
BY
Fraser, Myers & Manley
ATTORNEYS Patented Aug. 4, 1936

2,049,532

UNITED STATES PATENT OFFICE 2,049,532

PRESSURE GAUGE

Selden T. Williams, Bellerose, N. Y., assignor to A. Schrader's Son, Incorporated, Brooklyn, N. Y., a corporation of New York Application August 30, 1933, Serial No. 687,436
Renewed January 14, 1936

4 Claims. (Cl. 73—111)

My present invention relates to pneumatic tire pressure gauges of the pencil type and aims to provide certain improvements therein. More particularly it relates to novel constructional features in the indicating member, in the means for guiding and holding the indicating member in indicating position and in the press-on foot of such gauges.

The invention and the novel features thereof will be better understood from the detailed description which follows, when considered in conjunction with the accompanying drawing and the appended claims.

In the drawing, wherein I have shown a preferred embodiment of my invention:—

Figure 1 is a longitudinal section through the gauge, the indicating member being shown in elevation.

Fig. 2 is a top plan view.

Fig. 3 is a section on the line 3—3 in Fig. 1.

Fig. 4 is a section on the line 4—4 in Fig. 3, the indicating member being shown in elevation.

Fig. 5 is a section along the line 5—5 in Fig. 2, the indicating member being shown in elevation and in projected relation to the casing.

Referring to the drawing, in the various figures of which the same reference characters are employed to designate corresponding parts, let A indicate a cylindrical tubular casing which at one end is formed with an inwardly-directed flange or lip $a$, and at its other end is externally screw-threaded, as indicated at $2a$. Within the casing A is mounted a pressure-responsive means in the form of a plunger B having a screw-threaded stem $b$ axially extending from one face thereof, and over which is adjustably screw-threaded a sleeve $2b$ which is closed at its outer end and there provided with a screw-driver slot $3b$. The plunger is provided with a leather or equivalent compressible cupped packing $4b$ which frictionally engages the inner wall of the casing to provide a leak-tight seal therewith, and said packing being held upon said plunger by a bushing $5b$ which is force-fitted over a reduced axial stem $6b$. Also mounted within the casing and adapted to be held in engagement with the inturned lip $a$ thereof, is a bushing C having a reduced portion $c$ which extends through through said lip and has at its outer end an inturned flange or lip $2c$ formed with a central polygonal opening $3c$, herein shown as square. At its inner end the bushing C is externally rabbeted to provide a portion of reduced diameter $4c$ which is force-fitted into an internal annular groove in the outer end of a second bushing D, which, at its inner end, is formed with opposite, inwardly-directed lips $d$ having parallel faces in alignment with a pair of parallel faces of the polygonal opening $3c$ in the outer end of the bushing C.

Within the casing A is a pressure-indicating member or bar E having the same cross-sectional contour as the polygonal opening in the bushing C and through which the bar extends, the said bar being guided by the opening $3c$ and by the parallel faces on the lips $d$. The bar E at its inner end is intended normally to contact with the outer end of the sleeve $2b$ and to be projected outwardly through the casing when the pressure-responsive means is subjected to fluid pressure. Resisting such fluid pressure is a helical coil spring F, one end of which abuts against the plunger B and the other end bears against the inner end of the bushing D. The indicating bar E is provided with pressure indicia $e$ on each of its faces and preferably these indicia on the adjacent faces are arranged in inverted relation so as to facilitate the reading of the gauge when held in either an upright or inverted position. The point to which the indicating bar normally projects beyond the outer end of the bushing C may be varied by adjusting the sleeve $2b$ with respect to the stud $b$ during the assembling of the gauge parts so as to compensate for any variations which may exist in the springs F and insure a proper pressure reading for said indicating bar. To prevent the indicating bar from being ejected or removed from the casing, it is provided with a stud $2e$ which is adapted to engage the inner end of bushing D when the gauge bar has been projected to its maximum degree from the casing.

To hold the indicating bar in pressure-indicating position after the gauge is removed from the influence of the pressure acting thereon and the pressure-responsive means has returned to its normal position, I provide a pair of leaf-springs G which are preferably of ogee or elongated S form, said springs being mounted within the bushing D to extend through the inner end thereof at the regions between the inturned lips $d$, by having their outer ends formed with an outwardly-directed lip $g$ which engages in an annular recess provided at the juncture of the bushings C and D. The outturned lips $g$ at the ends of the springs and the general ogee form of said springs provide them with two points of contact or engagement with the indicating bar and thus provide an efficient means for holding the said bar in any position to which it is projected by the plunger and until said bar is forcibly displaced from said position.

The pressure of the spring F acting upon the bushing D serves to hold said member and the bushing C to which it is connected at the outer end of the casing, and as the bushings and the casing have cylindrical outer surfaces which are in contact, a simple and quite satisfactory swivel connection is thereby provided between said bushings and the casing, and in turn, between the indicating bar and the casing. Because of said swivel connections the indicating bar may be turned relatively to the casing to facilitate the reading of the pressure indicia thereon.

The casing at its inner end is fitted with a press-on foot of improved design, which, as herein shown, consists of a member H having an internally screw-threaded socket $h$ in engagement with the threaded end $4b$ of the casing, and a second socket $2h$ disposed at an angle to the socket $h$, the two sockets being in open communication through a chamber $3h$. Within the socket $2h$ is a deflating pin J of cup-shaped form having an outwardly-directed rim flange $j$ seating against the bottom of said socket, the bottom of the cup having a perforation or central opening $2j$ therein to permit the ingress into and egress of air from the gauge. Surrounding the cup J is a compressible packing K which is held within the socket by an internal shoulder $l$ formed in a bushing L which is held within the socket $2h$ in any desired manner, preferably by being force-fitted therein. The inner end of the bushing L engages the cup flange $j$ and the bushing thereby serves to effectively hold both the cup and the packing within the socket. If desired, the foot portion may be provided with an outwardly-directed pin or projection M which may function as a tire deflator. Between the inner end of the casing A and the bottom of the socket $h$ there is positioned a perforated fiber or equivalent washer N, and between said washer and the chamber $3h$ there may be introduced a filter medium O, of any desired material.

The gauge parts are so proportioned and dimensioned as to render the gauge approximately the size of a fountain pen, so that it may be conveniently carried in the pocket of an operator and held therein against accidental loss by a spring clip P of any conventional construction. The various gauge parts are of simple construction which can be economically fabricated and assembled, whereby the gauge as a whole can be manufactured and sold at a reasonable price.

While I have shown and described a preferred embodiment of my gauge, it is to be understood that I do not wish to be limited to the details of construction disclosed, since the same may be varied without departing from the spirit of the invention.

What I claim is:

1. A pressure gauge for pneumatic tires or the like, comprising a tubular casing which is open at one end and formed thereat with an inturned lip, a pressure-responsive means movable in said casing, a non-circular indicating member movable by but not connected to said pressure-responsive means projectable through the open end of the casing, means held in engagement with the inturned lip on the casing at the open end thereof and having an opening for guiding the indicating member which extends therethrough, and a leaf spring having a lip supported by the last named means engaging a face of the indicating member to hold it in indicating position.

2. A pressure gauge for pneumatic tires or the like, comprising a tubular casing which is open at one end, a pressure-responsive means movable in said casing, an indicating member of polygonal cross-section movable by but not connected to said pressure-responsive means projectable through the open end of the casing, an element held in swivel relation to the casing at the open end thereof and having an opening corresponding to the cross-sectional form of the indicating member which extends therethrough, and leaf springs carried by the element and extending in the direction of movement of the indicating member engaging the faces thereof to hold it in indicating position.

3. A pressure gauge for pneumatic tires or the like, comprising a tubular casing which is open at one end, a pressure-responsive means movable in said casing, an indicating member of polygonal cross-section movably by but not connected to said pressure-responsive means projectable through the open end of the casing, a tubular element held in swivel relation to the casing at the open end thereof and having an opening corresponding to the cross-sectional form of the indicating member which extends therethrough and internal, longitudinally-extending recesses, and leaf springs disposed in said recesses in the tubular element frictionally engaging opposite faces of the indicating member to hold it in indicating position.

4. A pressure gauge according to claim 3, wherein the indicating member engaging springs are of ogee or elongated S form.

SELDEN T. WILLIAMS.